Patented Oct. 28, 1930

1,780,077

UNITED STATES PATENT OFFICE

RICHARD HERZ AND FRITZ SCHULTE, OF FRANKFORT-ON-THE-MAIN, GERMANY, ASSIGNORS TO GENERAL ANILINE WORKS, INC., OF NEW YORK, N. Y., A CORPORATION OF DELAWARE

SULFODERIVATIVES OF 1-AMINONAPHTHALENE-8-CARBOXYLIC ACID AND PROCESS OF MAKING THE SAME

No Drawing. Original application filed November 29, 1926, Serial No. 151,596, and in Germany December 4, 1925. Divided and this application filed November 17, 1927. Serial No. 234,035.

This application is a division of our application Serial Number 151,596, filed November 29, 1926, which has matured into Patent No. 1,728,995, dated Sept. 24, 1929.

In application Serial No. 122,030, dated July 12, 1926, a new and original process for manufacturing the 1-aminonaphthalene-8-carboxylic acid is described, which consists in allowing to react at elevated temperatures an alkaline acting agent on the 8-cyan-naphthalene-1-sulfonic acid.

This process is not limited to the 8-cyan-naphthalene-1-sulfonic acid, but also applicable to its nuclear substitution products, particularly to halogenated derivatives and those containing further sulfonic groups in the nucleus. These nuclear derivatives of the 8-cyannaphthalene-1-sulfonic acid are readily obtainable by diazotizing the 8-amino-naphthalene-1-sulfonic acids correspondingly substituted in the nucleous and treating the diazo bodies, thus produced, with cuprous cyanide, according to the Sandmeyer reaction.

In carrying out our process practically all methods may be applied, which are described in the above mentioned application, particularly caustic alkalies in aqueous or alcoholic solution or alkaline earths, preferably milk of lime may be used, either at ordinary pressure or in a closed vessel at elevated pressure.

Consequently according to the conditions under which the isolation is carried out, there are obtainable either derivatives of 1-amino-naphthalene-8-carboxysulfonic acid having the probable formula:

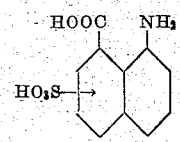

or sulfonic acids of naphthostyril having the probable formula:

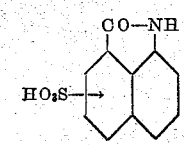

They may be represented by the following general formula:

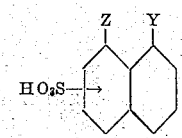

wherein Y represents an amino group and Z a carboxylic acid group, or Y and Z jointly represent the group

The sulfonic acid group may be bound to any free carbon atom of the naphthalene nucleus standing in $\beta$-position.

The derivatives of 8-cyannaphthalene-1-sulfonic acid containing further sulfonic acid groups in the nucleus yield according to the conditions applied either sulfonic acid or hydroxy derivatives of 1-aminonaphthalene-8-carboxylic acid or of its inner anhydride (naphthostyril). Under mild conditions, i. e. when treating with a caustic alkali solution advantageously in the presence of an alcohol at temperatures not substantially exceeding 135° C., or when treating with milk of lime in a closed vessel, generally the sulfonic acid derivatives of naphthostyril respectively of the 1-aminonaphthalene-8-carboxylic acid result, whereas at more elevated temperatures the sulfonic acid derivatives of the first phase of the reaction are converted into the corresponding hydroxy compounds.

These latter can be alkylated by means of alkylating agents and the formed alkoxy-naphthostyrils can be saponified to the corresponding alkoxyderivatives of the 1-aminonaphthalene-8-carboxylic acid.

All these sulfonic acid, hydroxy- and alkoxy derivatives of the 1-aminonaphthalene-8-carboxylic acid are new compounds, not described hitherto in literature. They are of particular value as intermediates for the production of dyestuffs and pharmaceutical compounds.

In order to further illustrate our invention the following examples are given, the parts being by weight and all temperatures in centigrade degrees, but it is understood that our invention is not limited to the particular products or reaction conditions mentioned therein:

Example 1

4 parts of caustic potash and 5 parts of methylic alcohol are heated for some time at 80–100° while stirring; at this temperature 1 part of the sodium salt of the 8-cyannaphthalene-1.6-disulfonic acid, derived from 8-aminonaphthalene-1-.6-disulfonic acid by Sandmeyer's reaction, is added. Then methylic alcohol is slowly distilled off, until the temperature of the mass rises to about 135°. At this temperature heating is continued for some hours under reflux. Then the mass is cooled down, diluted with water and gently acidified while cooling. With a strong evolution of sulfurous acid a new compound separates, which has probably the chemical constitution of the 1-aminonaphthalene-8-carboxylic-6-sulfonic acid of the formula:

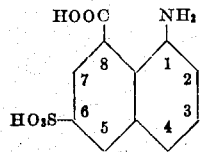

The new acid is diazotizable and capable of combining with diazo compounds.

By shortly heating it with acids or when strongly acidifying the mass of fusion after the dilution with water, without cooling it, a yellowish colored crystallized compound separates, which is neither diazotizable nor capable of combining with diazo compounds. It is soluble in alkalies with a yellowish color and when heating this solution for some time the 1-aminonaphthalene-8-carboxylic-6-sulfonic acid is re-obtained. From these properties it is to be assumed that the substance has the constitution of the naphthostyril-6-sulfonic acid:

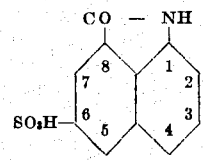

Example 2

1 part of the sodium or any suitable salt of the 8-cyannaphthalene-1.6-disulfonic acid is heated with 15 parts of milk of lime of 25° Bé. for some hours at 200–250° in an autoclave while stirring. After cooling down the mass is acidified and the separated 1-aminonaphthalene-8-carboxylic 6 sulfonic acid is filtered and purified by dissolving it in a solution of sodium carbonate, filtering this solution and precipitating it with acids.

The product, thus obtained, is according to its properties identical with the acid, described in Example 1.

We wish it to be understood that, when working in the autoclave, the pressure corresponds functionally to the tension of the reacting agent and the temperature applied.

We claim:

1. The process which comprises reacting under mild conditions with an alkaline agent upon a nuclear substitution product of 8-cyannaphthalene-1-sulfonic acid containing a further sulfonic acid group in the nucleus in $\beta$-position.

2. The process which comprises reacting with milk of lime at a temperature higher than 200° C. and not higher than 250° C. in an autoclave upon a nuclear substitution product of 8-cyannaphthalene-1-sulfonic acid containing a further sulfonic acid group in the nucleus in $\beta$-position.

3. As new products the compounds of the general formula:

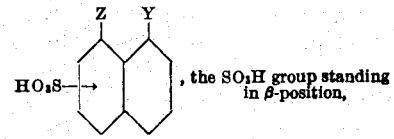

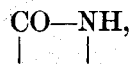

wherein Y represents an amino group and Z a carboxylic acid group, or Y and Z jointly represent the group

CO—NH, being in the open form, when dry, colorless powders soluble in dilute soda solution, diazotizable and capable of combining with diazo-compounds, and in the form of their anhydrides being yellowish powders neither diazotizable nor capable of combining with diazo-compounds.

4. As a new product the compound of the general formula:

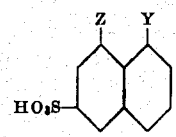

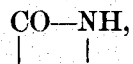

wherein Y represents an amino group and Z a carboxylic acid group, or Y and Z jointly represent the group

CO—NH, being in the open form, when dry, a colorless powder soluble in dilute soda solution, diazotizable and capable of combining with diazo-compounds, and in the form of its anhydride being a yellowish powder neither diazotizable nor capable of combining with diazo-compounds.

In testimony whereof, we affix our signatures.

RICHARD HERZ.
FRITZ SCHULTE.